United States Patent [19]

Lanzillo

[11] 4,054,271
[45] Oct. 18, 1977

[54] DEVICE FOR THE WORKING OF CANDY DOUGH HARD AND/OR FILLED CANDIES AND A DEVICE FOR CARRYING OUT THIS PROCEEDING

[75] Inventor: Ascanio Lanzillo, Genova, Italy

[73] Assignee: Carle & Montanari S.p.A., Milan, Italy

[21] Appl. No.: 664,169

[22] Filed: Mar. 5, 1976

Related U.S. Application Data

[63] Continuation of Ser. No. 466,555, May 3, 1974, abandoned.

[30] Foreign Application Priority Data

May 8, 1973 Italy .................................. 12609/73

[51] Int. Cl.² .......................... B01F 7/00; A21C 1/06
[52] U.S. Cl. .................................. 366/70; 99/450.7; 366/76; 366/85
[58] Field of Search .................. 259/4 R, 6, 9, 10, 25, 259/26, 45, 46, 47, 192; 425/131.1, 133.1, 311; 99/353, 450.6, 450.7, 483

[56] References Cited

U.S. PATENT DOCUMENTS

| | | | |
|---|---|---|---|
| 2,261,977 | 11/1941 | Deutsch | 425/131.1 X |
| 3,541,946 | 11/1970 | Johnston | 425/133.1 |
| 3,559,561 | 2/1971 | Page | 99/353 |
| 3,746,315 | 7/1973 | Rizzi et al. | 259/21 |
| 3,764,114 | 10/1973 | Ocker | 259/192 X |
| 3,771,937 | 11/1973 | Harmon et al. | 425/311 X |

*Primary Examiner*—Leonard D. Christian
*Attorney, Agent, or Firm*—Ralph W. Kalish

[57] ABSTRACT

A device for working candy dough subsequent to delivery from a baking oven and prior to discharge for molding and cutting comprising effecting continuous travel of said mass under a pressure of between 500 and 700 mm Hg. and in an environment substantially free of air, steam, or gas, while continuously kneading and cooling the mass with concurrent intermixing of additives and optional introduction of filler. The invention also comprehends a machine having parallel rotors within intersecting cylindrical containers, there being heat transfer means surrounding said containers with an inlet at one end for the mass to be worked and an outlet at the other end for the mass subsequent to working. An intermediate feed duct is provided for introducing additives into the mass and a discharge head is provided at the outlet end with a filler device being optionally mounted within said discharge head. The discharge head may have more than one nozzle so as to accommodate a plurality of production lines simultaneously.

14 Claims, 7 Drawing Figures

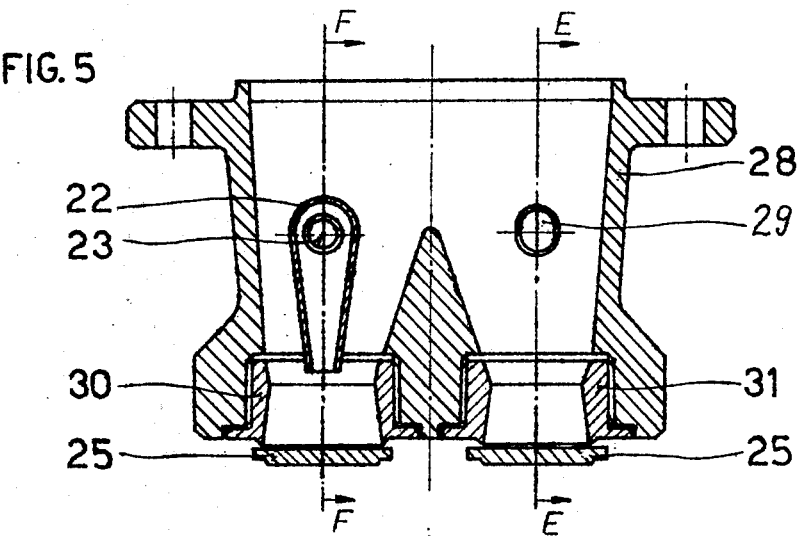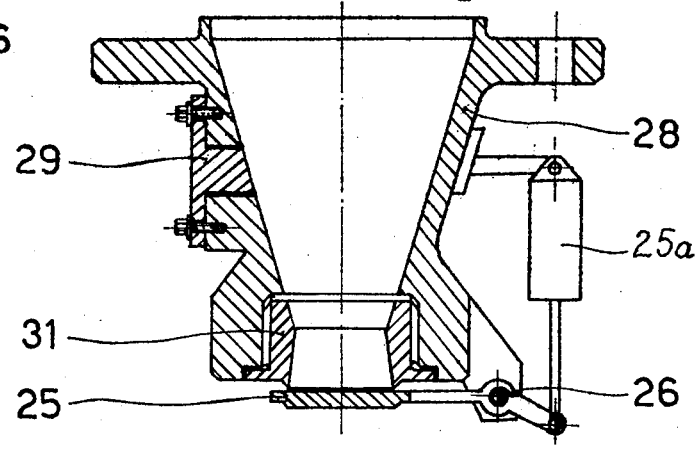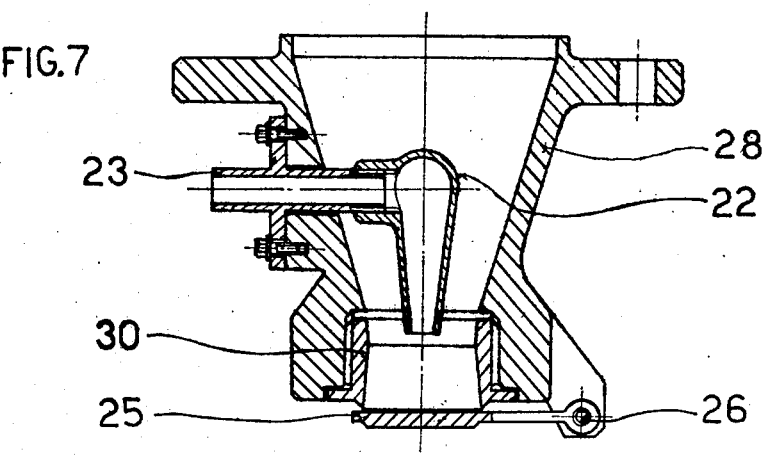

DEVICE FOR THE WORKING OF CANDY DOUGH HARD AND/OR FILLED CANDIES AND A DEVICE FOR CARRYING OUT THIS PROCEEDING

This is a continuation of application Ser. No. 466,555 filed May 3, 1974 and now abandoned.

BACKGROUND AND SUMMARY OF THE INVENTION

This invention relates in general to the art of making candy and, more particularly, to a device for the working of candy dough.

Heretofore, candy doughs are obtained from a solution having 70–80% dry contents, with the remaining 20–30% being water. The moisture content is reduced by means of steam heaters which increase the temperature of the solution to 125°–160° C and concentrate it either at atmospheric pressure or in vacuum, adjustably within the range of 500 mm Hg to 700 mm Hg. The resultant product is a thin, plastic dough easily worked, which, when leaving the concentrator, has a mean temperature between 105° and 125° C. The concentration is increased not only by removal of the water, but also by removal of the air incorporated into the dough during the preparation of the water solution mix of the ingredients. The retained humidity of the dough is, according to the type of candy to be made, as well as with respect to the particular technological process involved, from 0.8 to 3% of the weight of mass after concentration. When making soft or fondant candy the cooked dough, after leaving the concentrator, is spread out on cold tables or stainless steel strips cooled with water and at this juncture various additives (coloring agents, aromatics, acidulants, dextrose, etc.) are added while the temperature is lowered to 35° C – 40° C. When making hard candy, the flavors, coloring agents, acidulants and other additives are added, while the cooked dough is being discharged, or immediately after discharging. The homogenization is obtained together with the cooling of the mass on cold tables and in the kneading machine, the temperature reached being appropriate for the next step. This temperature, according to the particular involved technology, is between 60° C and 75° C. Once the above described steps have been completed, and this applies both to hard and to soft candy, the cooked dough is transferred by means of various type apparatus (bakery conveyors, rotating tables, steel belt conveyors) to the rolling machine, where the plastic dough is hardened and formed into strings of 35 mm to 50 mm diameter and filled, if and when desired. This step is followed by calibration (equalizing, molding, if required, and then cutting. Molding and cutting are normally used for hard candy, filled or unfilled. Unmolded candy, for example, fondant candy, is only cut and in general unfilled.

The above methods and apparatus for treating the candy mass are characterized by various drawbacks and, in particular, are time consuming, require expensive machinery and facilities, and where the plant facilities are partially open, the same do not satisfy hygienic rules and regulations. Furthermore, in the current plants, the candy mass is not perfectly hardened and seasoned, and the introduction of the additives is never complete. In addition, there is recognized resistane in the candy industry to alter presently practiced methods despite the recognized deficiencies and inadequacies resulting from the same.

Therefore, it is an object of the present invention to provide a method for working candy dough for producing fondant, hard and/or filled candies subsequent to receiving the same from the baking oven and prior to introduction of the treated material to the molding or cutting devices which obviates the time consuming, costly procedures heretofore performed.

It is another object of the present invention to provide a method of the character stated which may be effected in the absence of air or any other gas or steam and which is a continuous process as distinguished from batch operations.

It is a further object of the present invention to provide a method of the character stated which provides a continuous working of the candy dough whereby the admixing of the usual additives, the kneading, coloring and seasoning, and acclimatisation, as well as the filling, if desired, may be effected in an economic manner designed for high volume, relatively rapid production.

It is another object of the present invention to provide a method of the character stated which may be practiced under atmospheric conditions or in a vacuum, and which assures of homogenization of the resultant product.

It is another object of the present invention to provide a machine for effecting the continuous treatment of candy dough as received from a baking oven for effecting the admixing of additives, the kneading, coloring and seasoning, as well as acclimatisation in a highly efficient, rapid manner.

It is another object of the present invention to provide a machine of the character stated having a discharge head which is adapted, if desired, for filling of the candy.

It is another object of the present invention to provide a machine of the character stated having a head which may be provided with more than one outlet nozzle for accommodating concurrently a plurality of production lines.

It is a still further object of the present invention to provide a machine which is composed of relatively few parts which are of highly durable construction so as to render the machine resistant to breakdown; which machine is reliable in operation and which is economical in production as well as in use.

It is a still further object of the present invention to provide a machine of the character stated which obviates the necessity of the practice of a plurality of discrete steps in candy manufacture thereby reducing personnel requirements, as well as bringing about a most substantial saving of time.

BRIEF DESCRIPTION OF THE DRAWINGS

FIG. 5 is a horizontal sectional view of a head for the machine and being of the twin discharge type.

FIG. 6 is a horizontal transverse sectional view taken on the line E—E of FIG. 5.

FIG. 7 is a horizontal transverse sectional view taken on the line F—F of FIG. 5.

GENERAL STATEMENT OF THE INVENTION

Figure 1:
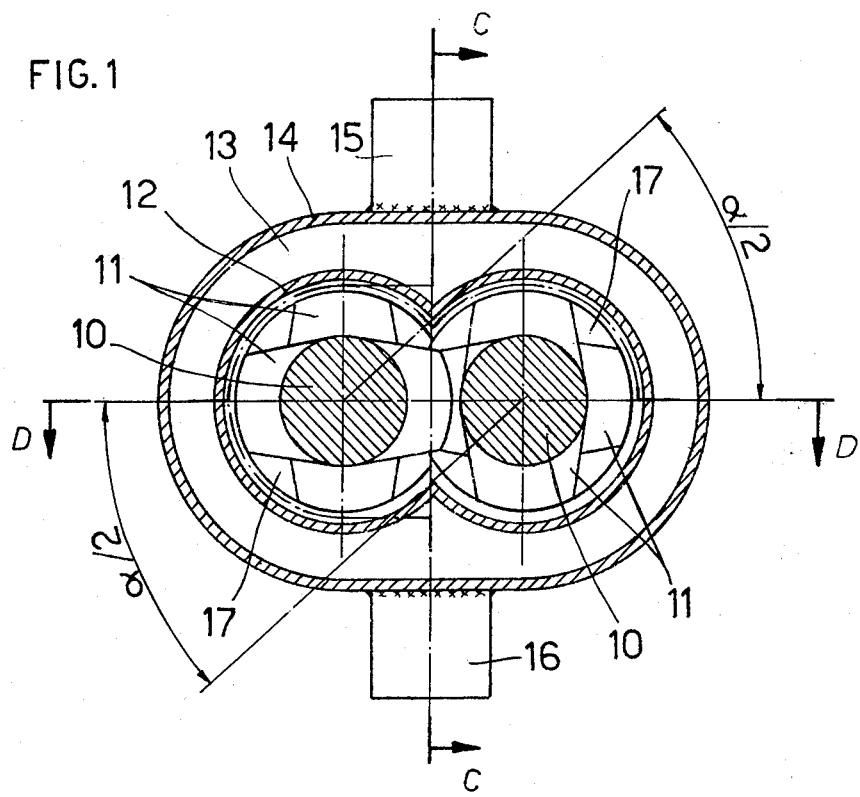
FIG. 1 is a vertical transverse sectional view of a machine for treating candy dough constructed in accordance with and embodying the present invention; the said view being taken on the line A—A of FIG. 3.
Figure 2:
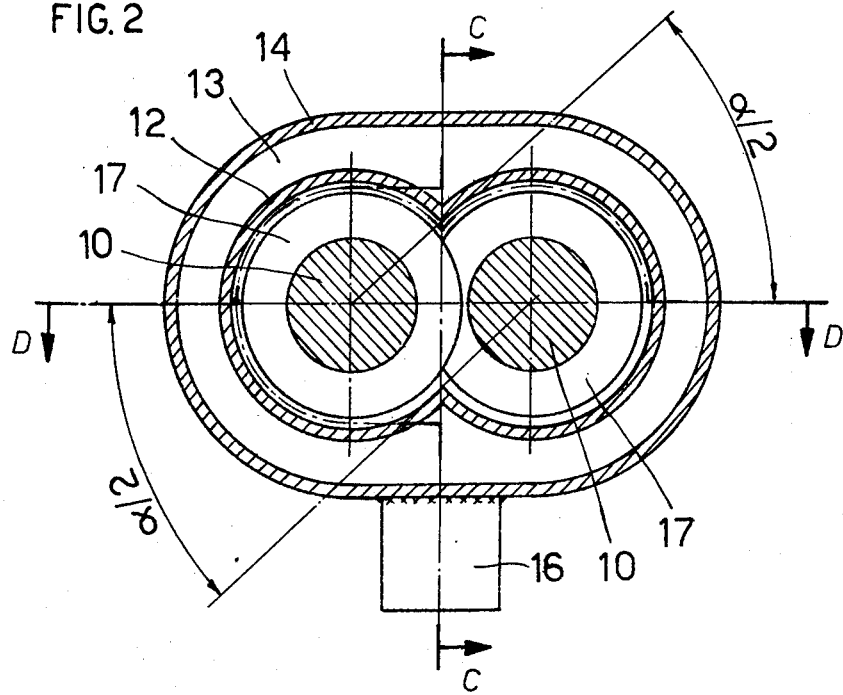
FIG. 2 is a vertical transverse sectional view taken on the line B—B of FIG. 3.

In essence, the practice of the process of the present invention permits the treatment of the candy mass from the oven in continuo, without the mass coming into contact with any gas or vapor and with the mass being continuously moved through a tubular container disposed between the cooking oven and the cutting device. During such travel, the mass is subjected to the following operations:

a. cooling and acclimatisation at 90°–110° C;
b. adding and intermixing of additives;
c. cooling and acclimatisation of the mass at 35°–40° C for soft candy, and at 60°–75° C for hard candy; and
d. calibration and discharging of the finished dough.

The machine for realizing the present process is provided with at least two cylindrical containers of circular section longitudinally linked together along lines which are defined on the surface of the cylindrical container shells by the points formed of the intersections of a chord with the circular cross surfaces of the container, each cylinder containing a rotor complete with screw feeder and mixing blades; one end of the container being provided with an inlet for receiving the candy mass discharged from the cooking oven, and the other end of the container being provided with an outlet or discharge head. The container is also provided between inlet and outlet with at least one opening for the feeding of the additive substances; the cylindrical containers being surrounded by a shell forming therewith a hollow space in which a thermal fluid is allowed to circulate.

The operation of the machine of the present invention allows continuous working, free from air or vapors, of the plastic polysaccharide mass and other ingredients received therein, assures of the extraction of the concentrate from the concentrator, the admixing of any additive (coloring agents, flavors, acids, dextrose and others), kneading, cooling and seasoning, acclimatisation and adding of the filling, if desired. The machine is directly connected to the outer opening of the concentrator but, if required, could also be fed by any conveying means which continuously transfers the plastic dough from the concentrator outlet to the inlet of the said machine.

The new machine replaces the flavor and coloring agent mixer, the cold tables and the cooling strips, the kneader, intermediate transfer means and the roller. In addition, the use of the machine, when suplied with the appropriate discharge head, makes it possible to feed simultaneously several production lines for filled and plain candies. For example, when using two production lines for hard candy, fed at the same time by the machine, the following three combinations can be satisfied: both lines may make unfilled candy, or both lines may make filled candy, or one line may make unfilled and the other one filled candy.

DESCRIPTION OF THE PREFERRED EMBODIMENT

Referring now by reference characters to the drawings which illustrate the preferred embodiment of the present invention, the machine for treating the candy mass comprises a main body 12 of two hollow cylinders or two pipes joined along two generatrices passing through the ends of the chord defined by the intersection of the circumferences limiting the area of the cross-section of the two pipes or on which rest two half-angles α/2 comprised between zero and 45°, the vertices of which coincide respectively with the centers of the bases of the two hollow cylinders. Around the main body 12 there is disposed to hollow spacing 13 (FIGS. 3 and 4) which is subdivided by baffles into several sections surrounded by an outer shell 14 carrying the inlets 16 and outlets 15 through sleeves for heat-exchanging fluids flowing through the said sections. Inside the main body 12 of the machine are two freely rotating shafts or rotors 10, optionally extractable, being in parallel and each coaxial with the related cylinder. The rotation of the two rotors may be equal or not, as desired. As shown in FIG. 4, as by arrows, the two rotors 10 rotate in opposite directions. The two rotors 10 are driven by a system of change-gears (not shown) at the outside of the main body. The two rotors each fixedly mount successively as proceeding outwardly, that is, from the left hand side of FIGS. 3 and 4 to the right hand side thereof, screw feeders 18, blades 11, and screw feeders 17, each element being shaped according to the intended work performed on the mass which passes through the machine and according to the direction of rotation of the two rotors.

The machine is provided with an inlet duct 19 for the plastic mass, a duct 20 for the feeding of the additives (coloring agents, flavors, acids and so on), and an interchangeable head 21. The head 21 contains the device for supplying the filling 22, if required, for making filled candies. Said device 22 is supplied through a batching pump (not shown) and duct 23. The outlet nozzle 24 is provided with a gate 25 which rotates freely or is driven by a servo control 25a around a pivot 26, the latter to seal the machine when it is connected to vacuum concentrators. The head 21 can be exchanged to enable the machine to work with multi-nozzle heads for feeding at the same time more than one production line.

As may best be seen in FIGS. 5, 6, and 7, another form of head 28 may be used in lieu of head 21; said head 28 having two discharge nozzles and being adapted for facile replacement of head 21.

The operation of head 28 permits the simultaneous supplying of the candy mass for two production lines, one for filled candy, and the other one for plain candy. Head 28 comprises a plug 29 closing the opening provided to permit the fitting of a second unit comprising the two elements 22 and 23; a threaded lock nut 30 having a narrow section designed for making filled candy; a threaded lock nut 31 designed for the making of unfilled candy. It is evident that, given the interchangeability of the mechanical parts, the production lines can be reversed by simply inverting the corresponding devices; two production lines for the making of filled candy can be supplied by replacing tap 29 and lock ring 31, respectively, by a group formed of a unit 22–23 and a lock nut type 30; or two production lines for unfilled candy replacing the unit 22–23 and the lock nut 30, respectively, by a plug 29 and a lock nut 31. Similar combinations can be realized when using heads having more than two discharge nozzles.

Figure 3:
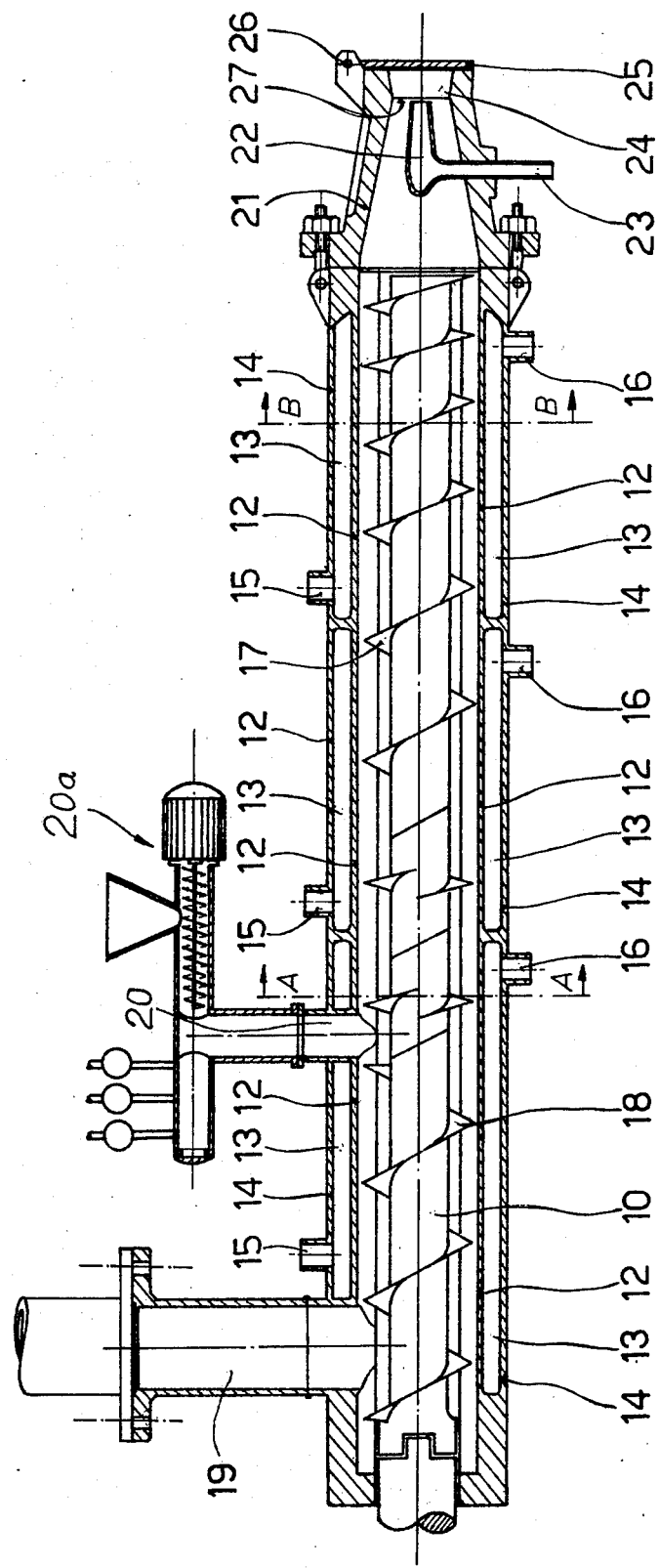
FIG. 3 is a vertical longitudinal sectional view of the machine.
Figure 4:
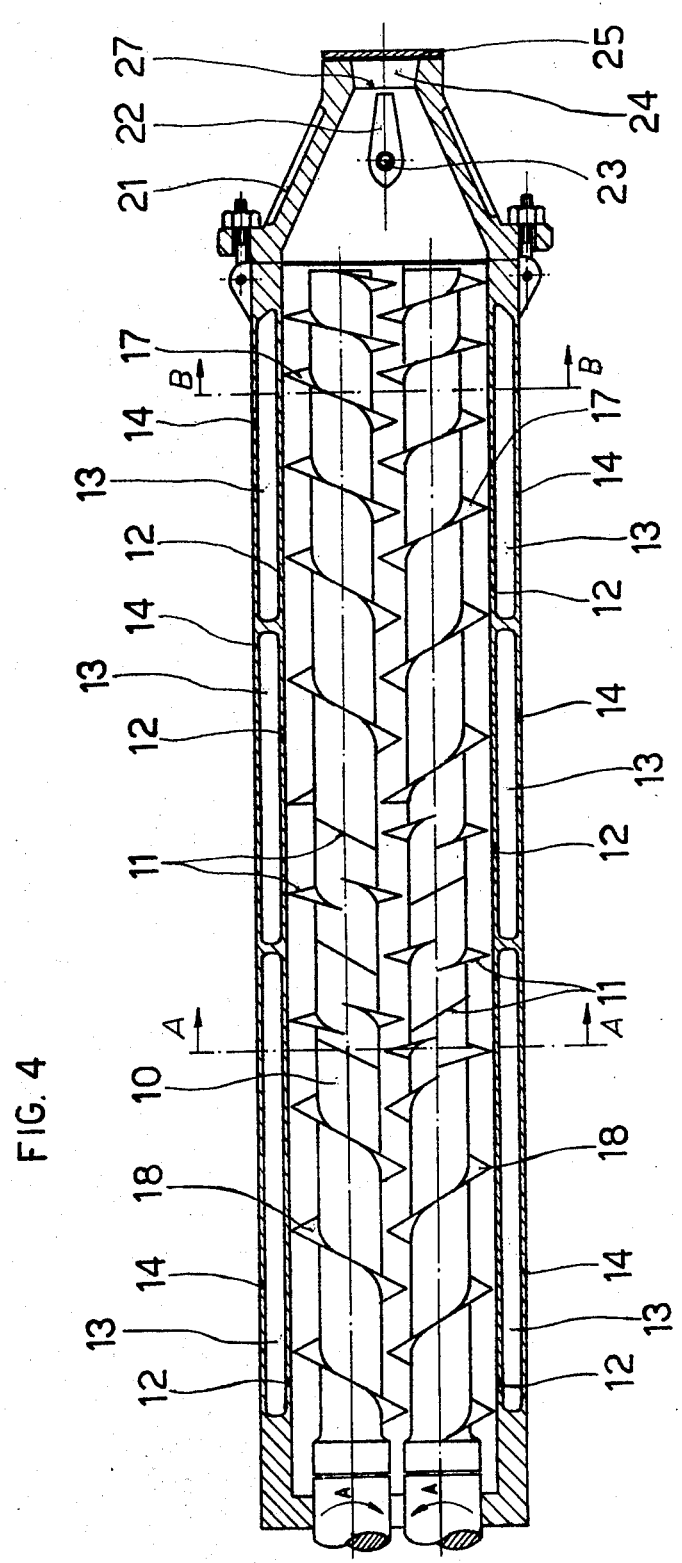
FIG. 4 is a longitudinal sectional view of the machine at an angle of 90° to the view shown in FIG. 3 and as indicated generally by the line D—D of FIG. 1.

The working cycle is easily comprehended by reference to FIGS. 3 and 4 which show all the operating elements of a machine having a single-outlet head. The mass flowing from the concentration chamber or cooking oven is continuously fed into the machine entering through the inlet 19, and fills the chamber between the body 12 and the rotors 10, after having been reduced in thickness. The spirals 18 push the product toward the duct 20 which acts as the inlet for additives supplied by the batching apparatus 20a. During this stage of the cycle, the plastic mass is brought to a temperature of about 90° C. – 110° C. by means of the highly efficient heat exchange system effected by a fluid circulating into the hollow space 13, resulting in a product which is not sticky and lasting, and which, when required for hard candy, is clear and transparent. After the various additives pass through duct 20, they are continuously added to the part of the machine containing the blades 11 where the mass is subjected to an intensive kneading operation assured by the form of the blades and the main body 12 and resulting in the complete incorporation of the ingredients added through the duct 20 accompanied by the progressive cooling of the whole mass travelling through the machine. Homogenization and cooling to a temperature of 34° C–40° C for soft candy masses, and 60° C–75° C for hard candy masses, are completed during the flowing of the candy dough toward the outlet of the machine. This phase is assured by the screw feeders 17 which are an integral part of the rotors 10 and push the product into the head 21 which, depending upon the type of candy to be produced, may or may not be equipped with filler feeding device 22. The thrust exerted by the screw feeders 17 and the form of the head perimeter walls convey the cooked dough toward the discharge nozzle 24 and therethrough to the exterior. When passing through the narrow circular section 27, the plastic dough is reduced to a calibrated string as required for the successive working step. The herein described method does not change when the machine is fitted with the head 28, or one having more than two discharge nozzles. The only difference is that there will be as many dough strings as there are opening. The entire working process within the machine requires but from 30 to 90 seconds according to the amount of plastic dough produced by the concentrator.

When taking into consideration the entire working process to which the candy dough is subjected during the working cycle, that is, from the outlet of the cooking oven to the equalizer, mold or cutting device is performed in a continuous manner in a single machine; that only small amounts of the moving mass are directly in touch with the machine; and that the length of the working cycle is extremely short when compared to the methods heretofore used. By the practice of the method of the present invention, and by utilizing the machine, numerous advantages, substantially new in the art of candy making, are obtained, among which are the following:

continuous operation in absence of air or steam, not only when the machine is coupled to a vacuum oven, but also when it is used with atmospheric boilers; in fact, one the working process is initiated, the entire free space between the body and the rotors is filled by the plastic dough;

perfect homogenization of the additives, complete and careful kneading owing to the particular form of the machine body and the kneading blades, progressive cooling ensuring that the dough assumes a uniform temperature and a consistency which is desirable for cutting or molding, even of heavily filled products;

elimination of crystallization and sugar inversion phenomena;

operational flexibility in that a single machine using uniquely designed discharge heads capable of supplying simultaneously product for more than one production line for filled candies, or mixed (filled or unfilled) with the possibility of supplying to each production line a filling of different flavor;

compact plant arrangement with reduced overall dimensions due to the elimination of the flavor mixer, cooling and kneading tables, transfer conveyors for the worked sugared mass and roller devices;

reduction of the working time; and marked increase in production capacity.

Having described my invention, what I claim and desire to obtain by Letters Patent is:

1. A machine for the manufacture of a candy mass comprising: means defining at least two circular cross section cylindrical containers, said containers being longitudinally connected along lines formed on the surface thereof between the end points of a cord defined by the intersection of the circumferences of said containers thereby limiting the area of the cross sections thereof and cooperating to form a continuous enclosed chamber sealed from the environment therearound; an elongated rotor provided within each container, said rotors being in axially parallel relationship; means for effecting rotation of said rotors about the respective longitudinal axes thereof; means defining an inlet passageway for said candy mass into said chamber located adjacent one end of said chamber; means defining an outlet passageway for said candy mass located adjacent the end of said chamber opposite said one end; a first screw feeder on each of said rotors on respective end portions of said rotors adjacent said one end of said chamber; a second screw feeder on each of said rotors located on the end portion of the respective rotors adjacent said opposite end of said chamber; a series of kneading blades provided on each rotor and being located on a respective rotor intermediate said first and second screw feeders; means defining a shell surrounding said container and being disposed radially outwardly therefrom to create an intervening volume; means sectionalizing said volume longitudinally to provide separate heat transfer compartments within said volume of preselected longitudinal extent; a fluid inlet and a fluid outlet being provided for each of said compartments; conduit means communicating between a candy mass additive source and said chamber and entering said chamber at a point contiguous with said series of kneading blades for introducing additives into said candy mass.

2. A machine as defined in claim 1 and further characterized by the screw feeders and mixing blades on one rotor overlapping the screw feeders and mixing blades on the other rotor.

3. A machine as defined in claim 1 and further characterized by the sweep of the screw feeders varying in longitudinal direction.

4. A machine as defined in claim 1 and further characterized by said first screw feeders being located between said inlet and said conduit means and said kneading blades being located between the point of entry of said conduit means and said outlet.

5. A machine as defined in claim 1 and further characterized by there being a source of the candy mass to be worked and means connecting said source with said inlet.

6. A machine as defined in claim 1 and further characterized by said outlet means having a discharge nozzle.

7. A machine as defined in claim 1 and further characterized by said outlet means having more than one discharge nozzle.

8. A machine as defined in claim 1 and further characterized by said outlet means having at least one nozzle and said nozzle tapering in the direction of flow of the candy mass.

9. A machine as defined in claim 1 and further characterized by means for introducing a filler within the candy mass being provided within the outlet means.

10. A machine as defined in claim 1 and further characterized by said outlet means having more than one discharge nozzle, and sealing means for selectedly closing said nozzles.

11. A machine as defined in claim 1 and further characterized by a closure provided on said outlet means and means for controlling operation of said closure.

12. A machine as defined in claim 11 and further characterized by said means for controlling said closure being a servo mechanism.

13. A machine as defined in claim 1 and further characterized by said outlet means having at least two discharge nozzles and filler means for introducing filler within the candy mass moving through said outlet means and means for selectively mounting said filler means within said nozzles.

14. A machine as defined in claim 1 and further characterized by said conduit means being a feed duct, there being batching means provided exteriorly of said machine, and means connecting said feed duct to said batching means.

* * * * *